United States Patent Office 3,335,366
Patented Aug. 8, 1967

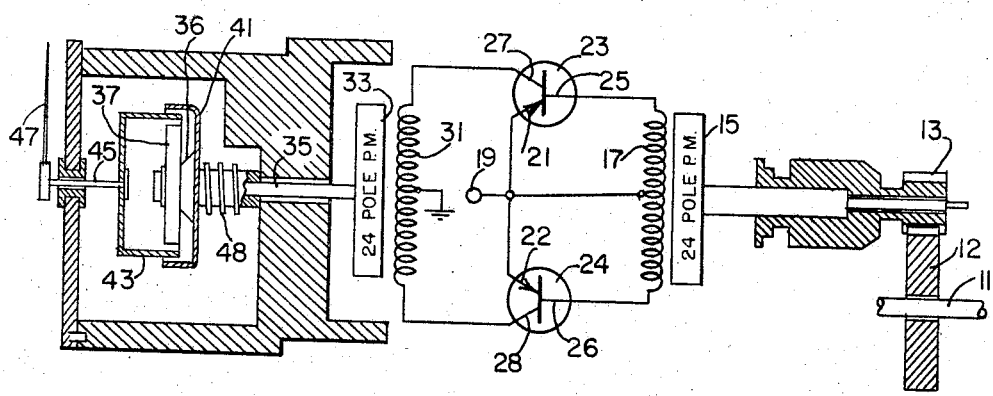
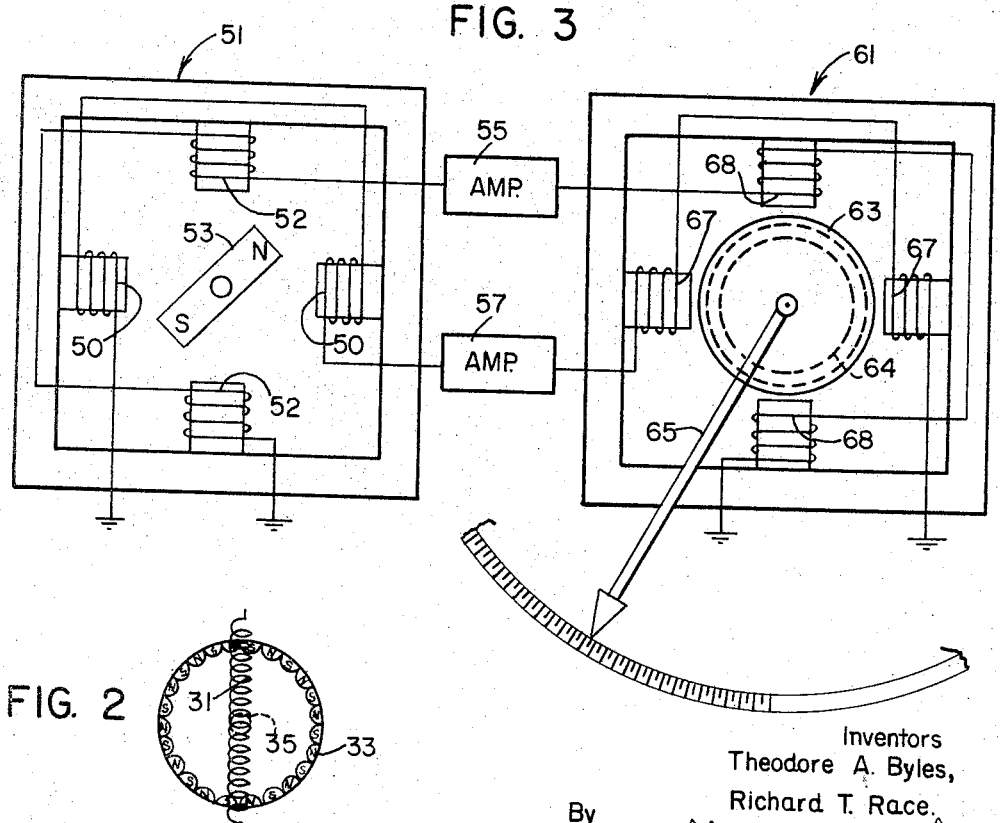

3,335,366
ELECTRONIC SPEEDOMETER WITH TRANSISTOR AMPLIFIER
Theodore A. Byles, Villa Park, and Richard T. Race, Chicago, Ill., assignors to Motorola, Inc., Chicago, Ill., a corporation of Illinois
Filed Oct. 2, 1964, Ser. No. 401,178
2 Claims. (Cl. 324—70)

This invention relates to speedometers for indicating the speed of a vehicle, and more particularly to an improved speedometer which does not utilize a mechanical drive cable.

Speedometers presently in use have mechanical drive cables with one end connected to a portion of the vehicle which rotates at a speed proportional to the speed of the vehicle and having the other end connected to drive the speedometer. Thus, for example, the cable may extend from the transmission or drive shaft of the vehicle to the speedometer in the dash panel. Mechanical speedometer cables are subject to a number of difficulties such as a high frequency of failure, and difficulty of assembly and placement in the vehicle. Such cables also are especially unsatisfactory when the length of the cable is relatively long, such as in trucks and busses, because of the fact that the torsional twisting of the cable yields inaccuracies in the speedometer reading.

It has been proposed to utilize a speedometer which is not driven by lengthy mechanical cables, however, such systems have heretofore been complex and unreliable. Sufficient power to drive conventional type indicators has necessitated excessively large pickup devices. Conversely, compact pickup devices may not supply sufficient power to drive the indicator.

Accordingly, it is an object of this invention to provide an improved speedometer for indicating the speed of a vehicle.

Another object of the invention is to provide a speedometer which does not utilize mechanical drive cables.

Still another object is to provide a practical and compact electrical speedometer system.

A feature of the invention is the provision of a speedometer including an AC generator having a rotational speed corresponding to the speed of the vehicle, a motor driven indicator, and a connecting amplifier circuit to drive the motor according to the frequency of the generated voltage.

Another feature of the invention is the provision of an AC generator, an indicator driven by a synchronous motor, and a pair of alternately conductive transistors coupling the generator to the motor to drive the motor in accordance with the frequency of the signal produced by the generator.

Still another feature of the invention is the provision of a multi-phase generator, an indicator driven by a multi-phase motor, and a plurality of amplifiers, one for each phase, coupling the generator to the motor and driving the motor accordingly to the frequency of the voltage produced by the generator.

In the drawings:

FIG. 1 is a partially schematic and partially half section view of a speedometer system constructed in accordance with the invention;

FIG. 2 is a schematic plan view of the motor of FIG. 1; and

FIG. 3 is a schematic representation of another embodiment of the invention.

In accordance with the invention, an electronic speedometer for a vehicle includes an AC generator which is operable in synchronism with a portion of the vehicle which rotates at a speed proportional to the speed of the vehicle. Such a portion could be, for example, the transmission or the drive shaft. The generator produces a voltage of alternating polarity having a frequency which is variable in proportion to the speed of the vehicle. An indicator device, which may be mounted in the dash panel of the automobile, provides an indication of vehicle speed in proportion to the frequency of alternating voltage applied to the indicator. A transistor amplifier couples the generator to the indicator device and applies an alternating voltage to the indicator at a level to properly operate the same. The voltage applied to the indicator varies according to the frequency of the voltage produced by the generator. Thus, the indicator device provides an indication of the speed of the vehicle.

Referring more particularly to FIG. 1, a shaft 11, which may be part of the transmission or the drive shaft of the vehicle, includes a gear 12 thereon. Gear 12, accordingly, rotates in synchronism with the speed of the vehicle. A gear 13 is engaged with gear 12 and drives an annular 24 pole permanent magnet 15. The rotating magnet 15 produces a current in winding 17. Winding 17 is center tapped to a source 19 of B+ potential, which source 19 is also connected to the emitter regions 21 and 22 of transisors 23 and 24 respectively. The base regions 25 and 26 of transistors 23 and 24 are respectively coupled to opposite ends of windings 17. The collector regions 27 and 28 of transistors 23 and 24 respectively, are connected to a synchronous motor having a field consisting of a winding 31, which may be of bifilar construction. Thus, the rotating magnet 15 produces an alternating current in winding 17 which alternately switches transistors 23 and 24 to produce an alternating current of constant voltage in winding 31.

The sychronous motor also includes a 24 pole annular permanent magnet 33 placed adjacent winding 31 to be in the field produced by the current therethrough. Thus, the alternating current in winding 31 will step permanent magnet 33 in rotating fashion due to the alternating pole alignment of the permanent magnet as may be more readily understood from FIG. 2. Permanent magnet 33 is connected through a drive shaft 35 and a slip clutch 36 to rotate a two-pole permanent magnet 37. Magnet 37 is set in the interior of a stationary steel cup 41, and an aluminum drag cup 43 is disposed to extend in the gap between magnet 37 and cup 41. Drag cup 43 is connected through a shaft 45 to a pointer 47. The torque developed in shaft 35 by the synchronous motor comprised of magnet 33 and winding 31 will displace the aluminum drag cup 43 angularly so that pointer 47 will produce a visual indication of the speed of the vehicle. The torque developed in the drag cup by the synchronous motor will be directly proportional to the frequency of the voltage developed by the generator. The slip clutch 36 aids the motor in starting against the inertial load of the system at very low speeds. It has virtually no effect on the accuracy of the system. Shaft 35 also drives an odometer worm 48, which may be used to drive a mileage counter of known construction. Other construction for the indicator might also be used within the scope of the inventive combination.

The DC resistance of the generator portion of the described system should be kept low to provide a low resistance base to emitter return path to provide good high temperature operation with low leakage current. The transistors 23 and 24 act as switches to put positive voltage on first one bifilar winding and then the other. This alternates polarity to step the motor into rotation. Thus with a 24 to 24 poles ratio, 12 cycles of alternating current will produce one rotation. The ratio between the poles of the magnet in the motor and the poles of the magnet in the generator is one to one in the system shown. However, other ratios would be possible depending upon the speed desired for displacement of the drag cup. The system will cause an odometer to show both forward and reverse mileage and the stepping motor provides excellent low speed operation.

Referring now to FIG. 3, a further embodiment of the invention is shown. A two-phase generator 51 includes a rotating permanent magnet 53, which may be driven from the transmission or similar rotating portions in the vehicle. Magnet 53 produces a voltage in coil pairs 50 and 52, each comprised of two series connected coils, which coil pairs are oriented at 90° to each other. The generator produces a two-phase voltage output of a 90° relationship, one phase of which is applied to amplifier 55 and the other phase of which is applied to amplifier 57. Such amplifiers may be single stage transistor amplifiers or may be multi-stage amplifiers. The outputs of amplifiers 55 and 57 are applied to the respective coil structures of an eddy current motor 61. A three or more phase system could also be used provided that the generator and the eddy current motor correspond in the number of phase coil structures.

The generator 51 develops a two-phase voltage, the frequency of which is proportional to the vehicle speed. The transistor amplifiers 55 and 57 amplify the two-phase information and supply the eddy current motor 61 with a constant voltage variable frequency two-phase signal. The eddy current motor 61 includes a two-phase stator with a spring loaded rotor comprised of aluminum drag cup 63 for driving the indicator pointer 65. Within the drag cup 63 is a circular piece of steel 64 which does not rotate with the cup but serves only to reduce the air gap. The amplifiers 57 and 55 serve to supply a constant voltage two-phase signal to the eddy current motor which has a frequency proportional to vehicle speed. The applied signal will cause the 90° oriented coil pairs 67 and 68 to set up a rotating field corresponding to the field of bar magnet 53 in the generator. The indicator then reads proportional to frequency because the torque developed in the drag cup, being proportional to frequency, results in the drag cup being displaced an angular amount which varies with the frequency.

From the foregoing it will be seen that the invention provides an improved speedometer which does not utilize mechanical drive cables. The indicator can be positioned at relatively great spacing with respect to the pickup without presenting a problem. The likelihood of failure is reduced and simplicity of construction is also provided. Inaccuracies due to torsional flexure of cables are not present.

We claim:
1. An electronic speedometer for a vehicle having a shaft which rotates in proportion to the speed of the vehicle including in combination, a generator including an annular multi-pole rotor and a stator winding having first and second ends and a center tap, said rotor being connected to the shaft of the vehicle, said generator producing a single phase voltage in said stator winding of alternating polarity having a frequency which varies in proportion to the speed of rotation of said rotor of said generator, a pair of transistors each having a base region connected to a respective one of said first and second ends of said generator stator winding and further having an emitter region, means connecting said center tap and said emitter regions of said transistor to potential supply means, a motor including first and second stator windings each having one end connected respectively to the collector region of one of said transistors and having the other end thereof connected together and to the potential supply means, said motor having an output shaft and a multi-pole rotor connected to said output shaft for driving the same, said transistors selectively coupling a portion of the amplified voltage from said generator to said first and second stator windings of said motor thereby causing said motor rotor and said output shaft to rotate in accordance with the speed of rotation of said generator rotor, and indicator means comprising a rotatable two pole permanent magnet, a slip clutch coupling said permanent magnet to said output shaft to be rotated thereby, a steel cup containing said permanent magnet and a drag cup having a pointer attached thereto, said drag cup having a portion of its perimeter extending between the ends of said permanent magnet and said steel cup, whereby said slip clutch accommodates said motor to the inertia of said indicator to prevent stalling, said pointer producing a visual indication of the speed of the vehicle in proportion to the speed of rotation of the shaft of the vehicle.

2. The electronic speedometer of claim 1 wherein said rotors of said generator and motor have 24 poles each.

References Cited
UNITED STATES PATENTS

| | | | |
|---|---|---|---|
| 1,941,615 | 1/1934 | Mirick | 318—23.5 |
| 1,999,347 | 4/1935 | Urfer | 324—70 |
| 2,211,543 | 8/1940 | Kollsman | 324—70 |
| 2,232,789 | 2/1941 | Kollsman | 324—70 |
| 2,339,743 | 1/1944 | Norman | 324—70 |
| 2,436,639 | 2/1948 | Faus | 318—23.5 |
| 2,461,511 | 2/1949 | Baecher | 318—23.5 |
| 2,669,678 | 2/1954 | Pfuntner | 318—23.5 |
| 2,855,887 | 10/1958 | Mumford | 73—519 |

OTHER REFERENCES
Semiconductor Devices and Applications, Greiner, pub. 1961, New York, p. 290.

RUDOLPH V. ROLINEC, *Primary Examiner.*

WALTER L. CARLSON, *Examiner.*

M. J. LYNCH, *Assistant Examiner.*